Aug. 24, 1926.

W. G. COX 1,597,019

END GUARD FOR AUTOMOBILES

Filed Dec. 29, 1922

2 Sheets-Sheet 1

Inventor
W. G. Cox.

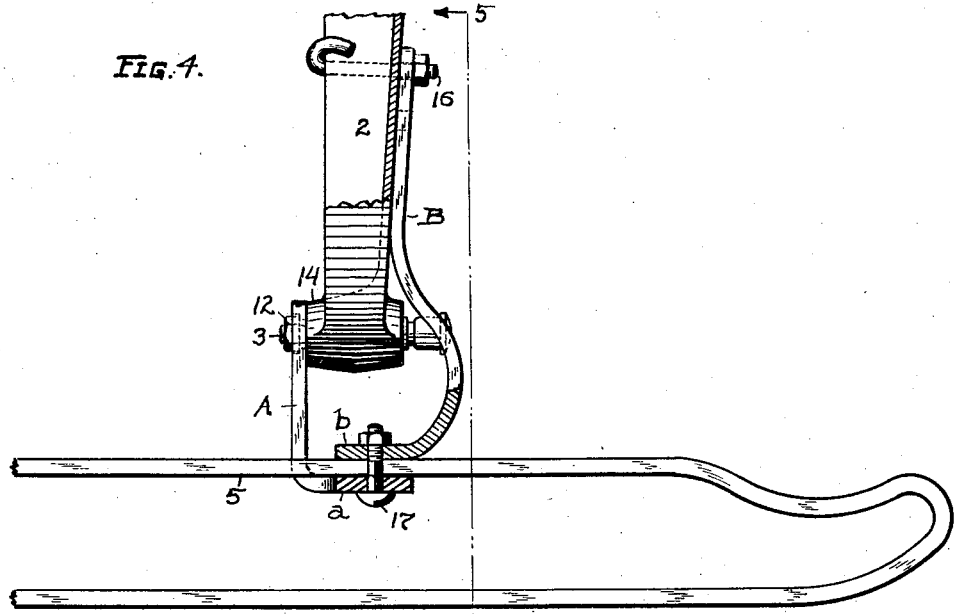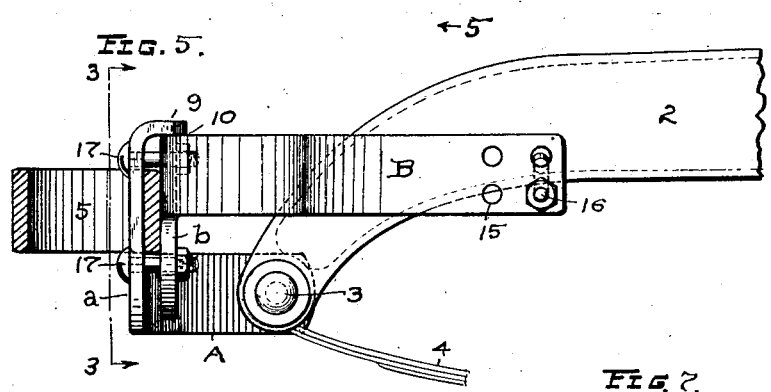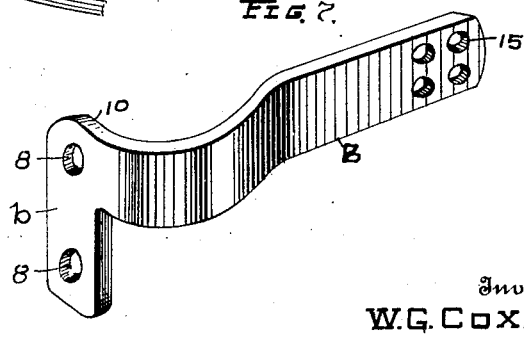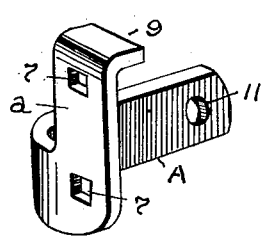

Patented Aug. 24, 1926.

1,597,019

UNITED STATES PATENT OFFICE.

WILLIAM G. COX, OF CLEVELAND, OHIO, ASSIGNOR, BY MESNE ASSIGNMENTS, TO THE EATON AXLE AND SPRING COMPANY, OF CLEVELAND, OHIO, A CORPORATION OF OHIO.

END GUARD FOR AUTOMOBILES.

Application filed December 29, 1922. Serial No. 609,678.

My invention pertains to an end guard for automobiles, and my present purpose is to provide a simple mode of clamping an end guard, shield, bumper, buffer or a supporting part therefor, in a rigid horizontal position upon and apart from the projecting ends of an automobile chassis frame, using the suspension-spring bolts of the car partly for that purpose, and forming the clamping members in a particular way to provide a universal fitting for frames in general use whereby their own attachment to the frame will be greatly facilitated and the clamping of the guard conveniently effected without supplementary devices other than mere bolts and nuts.

Figure 1:
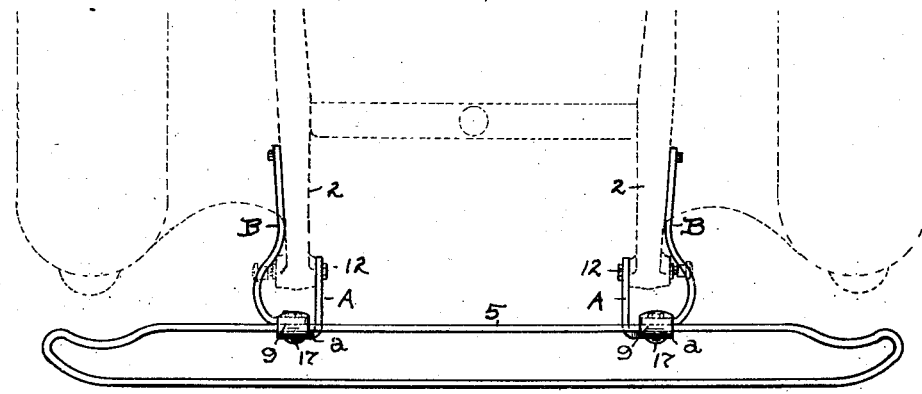
Figure 2:
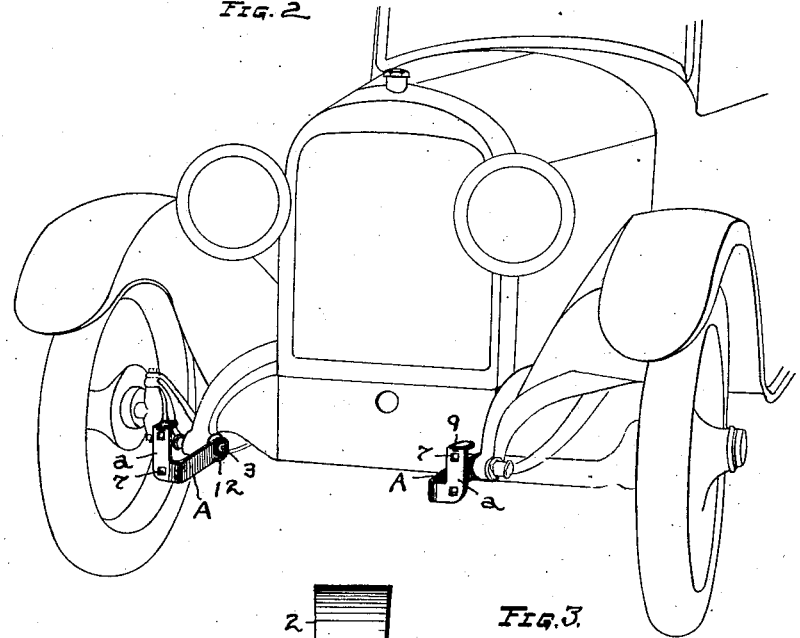
Figure 3:
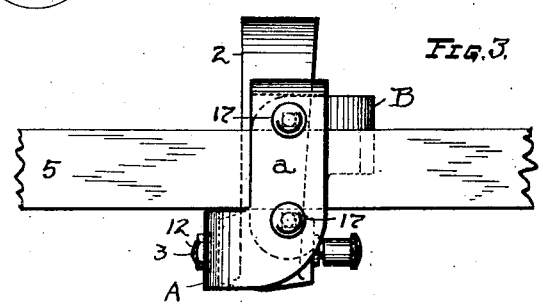

In the annexed drawings, Fig. 1 is a top view of a bow-shaped guard clamped within a set of my improved attachment members, the dotted lines representing one end of an automobile frame. Fig. 2 is a perspective view of the front end of an automobile, showing the shackle bolt attachment parts only, which when bolted in place serve as rests for the guard itself in further attachment operations. Fig. 3 is a front view slightly enlarged, of one pair of supporting clamps affixed to one end of the side member of a frame and with a short piece of the guard clamped therein, this view being taken on line 3—3 of Fig. 5. Fig. 4 is a top view, partly in section, of the supporting clamps and frame end shown in Fig. 3, including a portion of a bow-shaped guard. Fig. 5 is a vertical cross section and side elevation on line 5—5 of Fig. 4. Figs. 6 and 7 are separate perspective views of the two clamping sections which when united together form a unitary clamping support and attachment fitting for the guard.

Automobile chassis frames in general use comprise channeled side members 2 which taper and extend downwardly on curved lines at their ends where a yoke connection or bearing is provided to receive a shackle bolt 3 for the suspension spring 4. It is a common practice to support end guards or shields 5, commonly called bumpers or buffers, upon the frame extensions, using either rigid or resilient brackets or arms. However, these frame extensions vary considerably in size and shape, and the mud guards or fenders, and the aprons or splash pans, must also be considered in mounting and attaching the supporting brackets or arms for the end guards upon and to the frame. Moreover, the frames of different cars vary in width and their heights from the ground differ also. I meet all these conditions and provide a universal fitting or attachment device for end guards 5 of many different types or kinds by making a supporting member of two separable parts A and B, having angular portions a and b, respectively, adapted to clamp the guard therebetween. The angular clamping portions a and b respectively, are of sufficient length to permit them to overlap when the main body portions A and B are fixed substantially parallel upon opposite sides of frame end 2, for example as shown in Fig. 4. In other words, the clamping portions extend horizontally in opposite directions one behind the other and also extend vertically in opposite directions to provide relatively long flat vertical clamping faces opposite one another. Spaced bolt openings 7 and 8 are provided in the vertical clamping portions a and b, respectively. Member A has a relatively short body, and the upper end of its upwardly-extending arm or clamping portion a is bent rearwardly at right angles to provide a short lip or flange 9 adapted to overlap the upper edge 10 of the angularly-bent portion b of member B when the parts are assembled in clamping relation. The horizontal arm or body portion of member A has an opening 11 near its rear end whereby this member may be fitted over the inner projecting end of shackle bolt 3 and clamped tightly by a nut 12 against the boss or enlargement 14 on frame end 2. As exemplified herein member A is a flat steel bar which is bent at right angles in the plane of its flat surface and thence bent upwardly edgewise and finally in the flat again at its upper end. When bolted rigidly in place on the frame end 2, member A extends forwardly and thence outwardly toward the fenders of the car and thence upwardly directly opposite but apart from the chassis frame end 2. In supporting an end guard two such shackle-bolt attachment members A are employed on opposite sides of the chassis frame, together with two outer attachment or bracing members B. Each member B has a relatively long horizontal arm or body portion adapted to bear flat against the outer flat side or the channel frame 2 and to extend forward horizontally in a higher plane than the horizontal arm portion of member A, and a series of bolt openings 15 in the rear flat end of member B, permit a hook-bolt 16 or other fastening device to clamp member B rigidly against frame 2, the different openings 15 permitting different settings of the bolt for differently curved frame ends. Member B is also made of a flat steel bar which is bent in the flat on a sweeping compound-curve between its rear attachment end and its front clamping portion $b$ thereby giving this member a small degree of flexibility or spring which will permit the attachment ends of the two members A and B to be spread apart within limits and to extend parallel or out of parallelism without affecting the clamping relation of their respective clamping portions $a$ and $b$, or the registered alignment of the bolt holes 7 and 8 therein. Or conversely, when the two members A and B are clamped separately upon the frame with the bolt openings out of register member B may be sprung to place the holes in register to receive the bolts 17.

Thus, in attaching an end guard 5 to the vehicle, the guard may be placed at rest upon the upper edge of the horizontal arm or body portion of member A subsequently to fastening member A to shackle bolt 3. Then member B may either be fastened to the frame in clamping position against the guard 5 before clamping the guard itself, or said member B may be clamped to member A with the guard between prior to attaching member B to frame 2. Different kinds of guards 5 and different forms of frames 2 make it desirable to have this alternative mode of fastening of the parts together, and while inner member A is substantially fixed in respect to the frame because of its connection therewith by shackle bolt 3, the outer member B is in a sense adjustable forwardly or rearwardly in respect to the frame and to the clamping portion $a$ and therefore can accommodate and clamp guards of different thicknesses between the said members. Openings 8 in clamping portion $b$ may be either round or elongated and in the latter event a degree of vertical adjustability is afforded between the two members A and B whereby attachment of the device to different kinds of frames will be facilitated. The openings 7 in member A are preferably square to receive the square neck of carriage bolts 17 thereby preventing turning movement of the bolts when clamping connections are made. However members A and B may be modified to place clamping portion $b$ of member B at the front side instead of the rear side of clamping portion $a$ and in that event the square openings would preferably be placed in clamping portion $b$. As shown, guard 5 comprises a flat steel bar which is clamped between the two members A and B and the clamping portions $a$ and $b$ are flat to conform thereto, but if this guard were of other shape, say round, hexagonal, semi-round, etc., the clamping portions could be shaped correspondingly. As shown members A and B have their opposed overlapping clamping portions spaced apart and this relationship is fixed and unchangeable laterally that is to say, not capable of lateral adjustment in respect to frame end 2, inasmuch as the clamping bolts must pass through registering bolt openings in the respective clamping portions. As shown, the elongated body or arm portions of the respective members A and B are straight and parallel viewed from the side and lie in different horizontal planes one above the other, and their perforated attachment extremities are thereby placed above and below a horizontal median line as substantially defined by the guard itself which is located intermediate the upper and lower bolt openings in the vertical clamping portions $a$ and $b$, respectively. It should also be noted that members A and B are clamping members in themselves whereby a guard 5 may be secured in place thereon without other means than the bolts. In other words, no supplemental clamping device engages the guard to secure it to the two vertical guard supporting portions $a$ and $b$, as the invention has been expressly designed to omit and eliminate parts which may become loose or easily displaced by vibration. To that and other ends the invention is predicated largely on the idea of providing two independent attachment members with opposed or over-lapping anterior and posterior clamping portions or faces whereby the rear and front sides or faces of a part of the guard itself may be directly engaged and the guard clamped rigidly between the two members and not merely upon them.

What I claim is:

1. An end guard for an automobile, comprising a pair of separable frame-attachment members having opposed anterior and posterior clamping portions adapted to clamp a part of the guard directly therebetween.

2. An end guard for an automobile, comprising a pair of separable attachment members having overlapping clamping portions adapted to clamp a guard member therebetween, and bolts to draw said clamping portions facially toward each other.

3. An end guard for an automobile frame, and independent attachment members adapted to be affixed on opposite sides of an extending part of said frame having opposed clamping portions spaced apart in different vertical planes to permit a part of the guard to be interposed and directly clamped therebetween.

4. A means of attaching an end guard to an automobile frame, consisting of a set of guard supporting members each set comprising a pair of attachment parts, means to affix said parts separately on opposite sides of the ends of the automobile frame, each pair of said attachment parts having clamping portions extending vertically and horizontally in spaced overlapping relation to receive and clamp a part of the guard therebetween, and bolts to clamp said overlapping portions together.

5. An automobile attachment fitting for an end guard, comprising a pair of separate attachment members having reversely-extending clamping portions anteriorly and posteriorly related at the front ends thereof to permit a guard member to be rigidly clamped therebetween.

6. An attachment fitting adapted to support a guard member horizontally upon one end of an automobile frame, comprising a pair of clamping members having rearwardly extended body portions to permit attachment thereof to opposite sides of a frame member and transversely extended overlapping clamping portions at their front ends projecting vertically in reverse directions to permit a guard member to be clamped between said members, and means to draw said clamping portions together.

7. An attachment fitting for an end guard for an automobile, comprising a pair of separable attachment members having vertically-extended clamping portions provided with registering bolt openings, and a bolt for the registering openings.

8. A supporting and attachment fitting for an end guard for an automobile, comprising a pair of steel bars having corresponding front ends bent laterally into spaced overlaping relation and thence vertically in opposite directions, and means to draw said overlapped ends together.

9. A clamping fitting and support for an end guard for an automobile, comprising a pair of steel bars having attachment portions of different length and bent reversely into overlapping relation at their front ends to permit a guard member to be clamped therebetween, said attachment portions having bolt openings and said overlapping portions having registering bolt openings.

10. An attachment fitting for an end guard for an automobile, comprising a flat bar bent at right angles in the flat between its ends and thence edgewise vertically, a second flat bar bent at right angles in the flat between its ends and thence edgewise vertically, said bars having their vertical portions opposed flat-wise to each other and provided with registering bolt openings, and a clamping bolt for said openings.

11. An attachment fitting for an automobile end-guard comprising two members fitting respectively the front and rear sides of a guard-bar and the opposite sides of a frame-member of the automobile.

12. An attachment fitting for an automobile end-guard comprising two members fitted for attachment to the automobile frame and at their forward-ends provided respectively with upward and downward offsets fitted for attachment to the bumper.

13. An attachment fitting for an automobile end-guard comprising two members fitted for attachment to the automobile frame and at their forward ends provided respectively with upward and downward offsets spaced to fit the opposite sides of the end-guard.

14. An attachment fitting for an automobile end-guard comprising two members spaced apart transversely at their rear ends to embrace the two sides of a frame-bar and at their forward ends spaced apart longitudinally to embrace the end-guard.

15. An attachment fitting for an automobile end-guard comprising two members spaced apart transversely at their rear ends to embrace a frame member and at their forward ends spaced apart longitudinally to embrace the end-guard and also overlapping each other to embrace the same point of the end-guard.

16. An attachment fitting for an automobile end-guard, comprising two members fitted at their forward ends for attachment to the end-guard, and at their rear ends spaced apart to embrace the automobile end-frame for connection thereto at different levels.

17. An end guard fitting for an automobile having a shackle-bolt comprising two members fitted at their forward ends for attachment to the end guard and extending thence rearwardly for attachment to the automobile frame on different levels, one reaching to the shackle-bolt and the other to a higher point on the frame in rear of the shackle-bolt.

18. An attachment fitting for an automobile end-guard comprising two members fitted at their forward ends for attachment to the end-guard and at their rear ends spaced apart to embrace the automobile frame for connection thereto at different levels, one at the shackle-bolt and the other at a higher point in rear of the shackle-bolt.

19. An attachment fitting for an automobile end-guard comprising two members spaced apart at their forward ends to embrace the end-guard and spaced apart transversely at their rear ends for attachment respectively to the opposite sides of the frame at points thereon which are spaced apart vertically and longitudinally.

20. An attachment fitting for an automobile end-guard comprising two members spaced apart both vertically and horizontally at their rear ends to embrace the automobile frame on different levels, and provided at their forward ends with offsets for connection to the end-guard.

21. An attachment fitting for an automobile end-guard comprising two members spaced apart both vertically and transversly to embrace the automobile frame on different levels, and provided at their forward ends with offsets spaced apart longitudinally to embrace the end-guard.

In testimony whereof, I affix my signature hereto.

WILLIAM G. COX.